(12) United States Patent
Levi et al.

(10) Patent No.: US 12,182,854 B2
(45) Date of Patent: Dec. 31, 2024

(54) METHOD, MEDIUM, AND SYSTEM FOR SOCIAL NETWORK INITIATED LISTINGS

(71) Applicant: eBay Inc., San Jose, CA (US)

(72) Inventors: Or Levi, Amsterdam (NL); Ofer Schwartz, Ramat Gan (IL); Amir Kost, Bahan (IL); Itay Rizmovich, Netanya (IL)

(73) Assignee: EBAY INC., San Jose, CA (US)

( * ) Notice: Subject to any disclaimer, the term of this patent is extended or adjusted under 35 U.S.C. 154(b) by 462 days.

(21) Appl. No.: 17/560,770

(22) Filed: Dec. 23, 2021

(65) Prior Publication Data

US 2022/0114631 A1 Apr. 14, 2022

Related U.S. Application Data (63) Continuation of application No. 16/747,807, filed on Jan. 21, 2020, now Pat. No. 11,238,524, which is a (Continued)

(51) Int. Cl.
*G06Q 30/00* (2023.01)
*G06F 16/9535* (2019.01)
(Continued)

(52) U.S. Cl.
CPC ..... *G06Q 30/0641* (2013.01); *G06F 16/9535* (2019.01); *G06F 16/955* (2019.01);
(Continued)

(58) Field of Classification Search
CPC .......... G06Q 30/0641; G06Q 30/0601; G06Q 30/0603; G06Q 50/01; G06F 16/955; G06F 16/958; G06F 16/9535; G06F 16/9566

See application file for complete search history.

(56) References Cited

U.S. PATENT DOCUMENTS 6,687,677 B1 2/2004 Barnard et al.
9,299,099 B1 3/2016 Jayaram
(Continued)

FOREIGN PATENT DOCUMENTS

CN 102971762 A 3/2013
CN 104392310 A 3/2015
(Continued)

OTHER PUBLICATIONS

Roesner, Franziska, Tadayoshi Kohno, and David Wetherall. "Detecting and defending against {Third-Party} tracking on the web." 9th USENIX Symposium on Networked Systems Design and Implementation (NSDI 12). 2012. (Year: 2012).*
(Continued)

*Primary Examiner* — Matthew E Zimmerman
(74) *Attorney, Agent, or Firm* — SCHWEGMAN LUNDBERG & WOESSNER, P.A.

(57) ABSTRACT

Social network initiated listings can be implemented by using keyword extraction of a social network post containing a sell code. The extracted keywords can be categorized using a machine based categorization system. The listing user account of the post creator can be identified using active session analysis. A listing is created using the listing user account. A new post that contains a URL to the listing is then programmatically published on the social network.

17 Claims, 8 Drawing Sheets

Related U.S. Application Data continuation of application No. 15/705,913, filed on Sep. 15, 2017, now Pat. No. 10,559,028.

(60) Provisional application No. 62/395,741, filed on Sep. 16, 2016.

(51) Int. Cl.
| | | |
|---|---|---|
| *G06F 16/955* | (2019.01) | |
| *G06F 16/958* | (2019.01) | |
| *G06N 20/00* | (2019.01) | |
| *G06Q 30/0601* | (2023.01) | |
| *G06Q 50/00* | (2012.01) | |

(52) U.S. Cl.
CPC ........... *G06F 16/958* (2019.01); *G06N 20/00* (2019.01); *G06Q 30/0601* (2013.01); *G06Q 30/0603* (2013.01); *G06Q 50/01* (2013.01); *G06F 16/9566* (2019.01)

(56) References Cited

U.S. PATENT DOCUMENTS

| | | | |
|---|---|---|---|
| 10,559,028 B2 | 2/2020 | Levi et al. | |
| 11,238,524 B2 | 2/2022 | Levi et al. | |
| 2008/0208704 A1 | 8/2008 | Wang et al. | |
| 2008/0306830 A1* | 12/2008 | Lasa ..................... | G06Q 30/02 707/999.1 |
| 2010/0146110 A1* | 6/2010 | Christensen .......... | G06F 16/954 709/224 |
| 2012/0095881 A1* | 4/2012 | Rothman ............ | G06Q 30/0643 705/27.2 |
| 2013/0097279 A1* | 4/2013 | Polis ...................... | H04L 67/02 709/217 |
| 2014/0052587 A1 | 2/2014 | Bereck et al. | |
| 2014/0164398 A1 | 6/2014 | Smith et al. | |
| 2014/0279616 A1 | 9/2014 | Aoki et al. | |
| 2015/0149319 A1 | 5/2015 | Pattani et al. | |
| 2015/0370909 A1 | 12/2015 | Volach | |
| 2017/0149881 A1* | 5/2017 | Pan ......................... | H04L 51/52 |
| 2018/0082358 A1 | 3/2018 | Levi et al. | |
| 2020/0160429 A1 | 5/2020 | Levi et al. | |

FOREIGN PATENT DOCUMENTS

| | | |
|---|---|---|
| CN | 105550231 A | 5/2016 |
| IN | 105612720 A | 5/2016 |
| KR | 10-2009-0092341 A | 8/2009 |
| KR | 1020120135790 A | 12/2012 |
| KR | 1020150068457 A | 6/2015 |
| KR | 1020160000888 A | 1/2016 |
| WO | 2016/109029 A1 | 7/2016 |
| WO | 2018/051184 A1 | 3/2018 |

OTHER PUBLICATIONS

U.S. Appl. No. 15/705,913 U.S. Pat. No. 10,559,028, filed Sep. 15, 2017, Method, Medium, and System for Social Network Initiated Listings.
U.S. Appl. No. 16/747,807 U.S. Pat. No. 11,238,524, filed Jan. 21, 2020, Social Network Initiated Listings.
Notice of Allowability received for U.S. Appl. No. 16/747,807, mailed on Dec. 24, 2021, 5 pages.
Notice of Allowance received for U.S. Appl. No. 16/747,807, mailed on Sep. 20, 2021, 16 pages.
Fulmer, "Facebook could make eBay Obsolete", Retrieved from the Internet URL :<https://seekingalpha.com/article/3984689-facebook-make-ebay-obsolete>, Jun. 27, 2016, 5 pages.
Notice of Allowance received for Korean Patent Application No. 10-2019-7010748, mailed on Oct. 22, 2021, 3 pages (1 page of English Translation & 2 pages of official copy).
Office Action received for Korean Patent Application No. 10-2019-7010748, mailed on Sep. 25, 2020, 14 pages (7 pages of official copy and 7 pages of English translation).
Office Action received for Korean Patent Application No. 10-2019-7010748, mailed on Mar. 29, 2021, 4 pages (3 pages of official copy & 1 pages of English translation).
Corrected Notice of Allowability received for U.S. Appl. No. 15/705,913, mailed on Nov. 18, 2019, 4 pages.
Notice of Allowance received for U.S. Appl. No. 15/705,913, mailed on Oct. 9, 2019, 16 pages.
International Written Opinion received for PCT Patent Application No. PCT/IB2017/001295, mailed on Feb. 12, 2018, 10 pages.
International Search Report received for PCT Patent Application No. PCT/IB2017/001295, mailed on Feb. 12, 2018, 4 pages.
First Examination Report received for Australian Patent Application No. 2017328976, mailed on Oct. 17, 2019, 5 pages.
Juels et al., "Active cookies for Browser Authentication", Proceedings of the 14th Annual Network and Distributed System Security Symposium (NOSS), 2007, 18 pages.
Office Action Received for Chinese Patent Application No. 201780070994.6, mailed on Jul. 13, 2021, 30 pages (with English translation).
Office Action received for Chinese Patent Application No. 201780070994.6 mailed on Nov. 19, 2021, 25 pages (12 pages of English translation and 13 pages of official copy).
Anonymous, "What is the eBay API? I eBay Developers Program", Retrieved from the Internet URL: <https://web.archive.org/web/20160522070554/https://go.developer.ebay.com/what-ebay-api, XP055444300>, May 22, 2016, 1-2 pp.
International Preliminary Report on Patentability received for PCT Patent Application No. PCT/IB2017/001295 , mailed on Mar. 28, 2019, 12 pages.
"Korean Application Serial No. 10-2022-7002346, Notice of Preliminary Rejection mailed Apr. 20, 2022", w English Translation, 6 pgs.

* cited by examiner

METHOD, MEDIUM, AND SYSTEM FOR SOCIAL NETWORK INITIATED LISTINGS

RELATED APPLICATIONS

This application is a continuation of and claims priority to U.S. patent application Ser. No. 16/747,807, filed Jan. 21, 2020, which is a continuation of and claims priority to U.S. patent application Ser. No. 15/705,913, filed Sep. 15, 2017 and entitled. "Method, Medium, and System for Social Network Initiated Listings," now U.S. Pat. No. 10,559,028, which claims priority to U.S. Provisional Application No. 62/395,741, entitled "Social Network Initiated Listings," filed on Sep. 16, 2016. The contents of these prior applications are considered part of this application, and are hereby incorporated by reference in their entirety.

TECHNICAL FIELD

Embodiments of the present disclosure relate generally to Internet messages and, more particularly, but not by way of limitation, to managing publications between network sites.

BACKGROUND

Social Networks websites have recently grown in popularity to become some of the most visited websites on the Internet. The functionality of the social network websites is limited Typically, users of a social network website can communicate with each other and share posts only on that social network website, not others. Further, how the users interact with one another on a given social media website is highly regulated, e.g., posts have enforced guidelines. As such, users cannot use a social media post to interact or control actions other websites.

BRIEF DESCRIPTION OF THE DRAWINGS

Various ones of the appended drawings merely illustrate example embodiments of the present disclosure and should not be considered as limiting its scope.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In some example embodiments, a social network initiated listing system can be implemented by first submitting a query to a social network platform (e.g., social network website, messaging platform, one or more application programming interfaces of a website) requesting all social network posts that include a sell code. In some example embodiments, the sell code is a code using an anchor character (e.g., a hashtag, #) with a phrase indicating that the person wishes to sell a physical item described in a post. In some example embodiments, the sell code is a term used in an electronic message sent from one user to another user. For example, Alice can send an electronic message to Bob stating, "Hey, would you like to buy my scooter on eBay?" In those example embodiments, the system has programmatic access to messages sent between users and can identify the terms "buy" and "eBay" as a sell code to initiate the listing process. That is, the system is integrated server-side, and thus has access to posts from all users, regardless if the users are part of each other's respective social networks.

Keyword extraction can be performed on the queries that include the sell code to identify the product terms, attributes, and descriptive language. Machine based categorization can be performed on the keywords to more accurately categorize the item to be sold that is described in the post. Catalog data of the item can be identified using the categorization data. The user ID of the user can be identified by determining which users have two sessions active on the same client device, where one of the sessions is an active session of the social network website, and the other session is an active session of a listing site. Automatically, e.g., in response to a social media post or message being published, a listing can be generated and published on a listing website using the listing account that matches the user ID. The listing website and the social media are separate websites, having different domains, according to some example embodiments. Further a social network post that contains a link to the listing can be programmatically (e.g., via an API) published on the social network. When other users (e.g., potential buyers) click on the link (e.g., a URL) in the social network post, the other users' web browsers are directed to the listing on the listing website.

Figure 1:
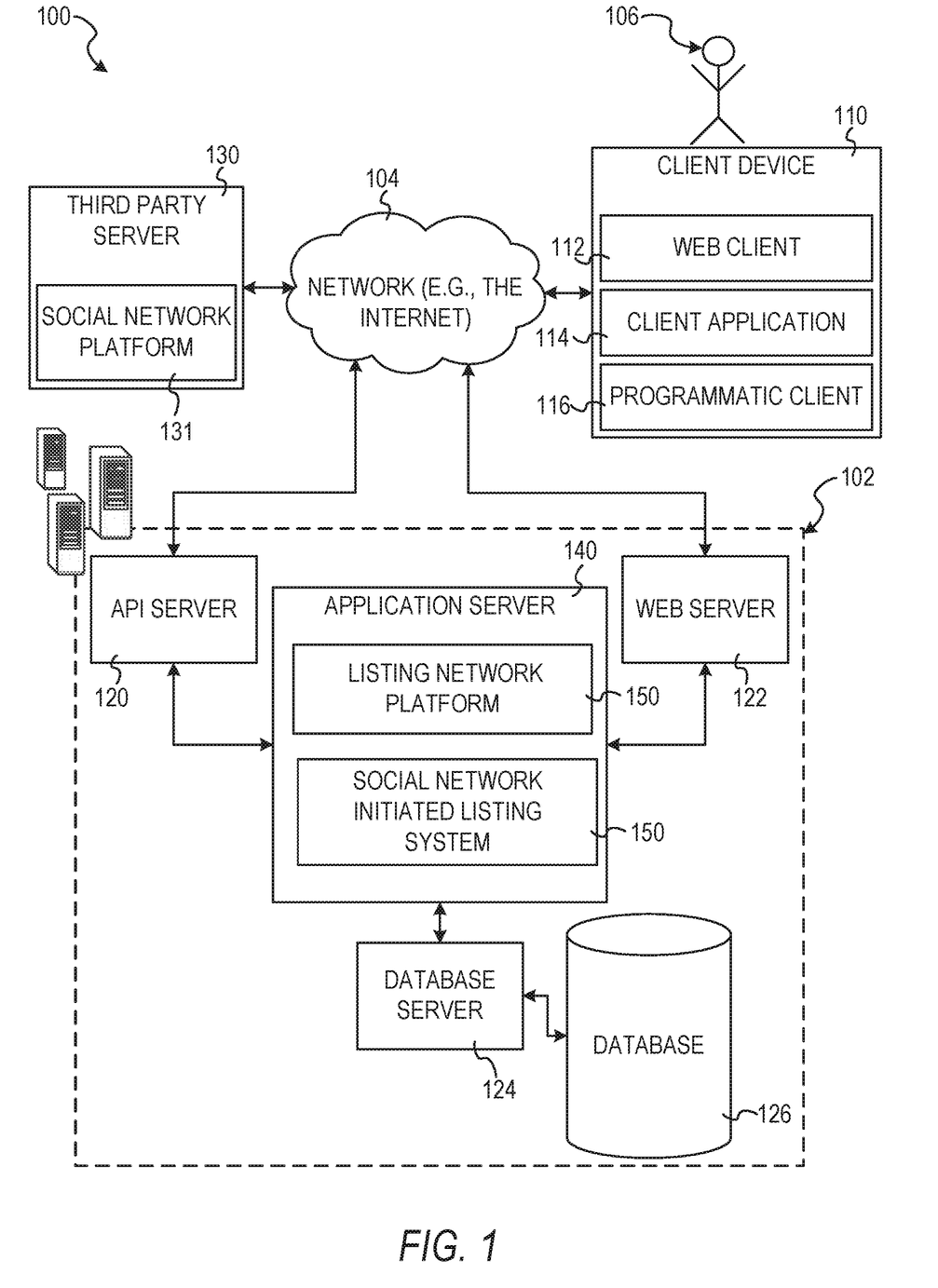
FIG. 1 is a block diagram illustrating a social network initiated listing system implemented in a networked environment, according to some example embodiments.

With reference to FIG. 1, an example embodiment of high-level client-server-based network architecture 100 is shown. A networked system 102, in the example forms of a network-based marketplace or payment system, provides server-side functionality via a network 104 (e.g., the Internet or wide area network (WAN)) to one or more client devices 110. In some implementations, a user (e.g., user 106) interacts with the networked system 102 using the client device 110. FIG. 1 illustrates, for example, a web client 112 (e.g., a browser), applications 114, and a programmatic client 116 executing on the client device 110. The client device 110 includes the web client 112, the client application(s) 114, and the programmatic client 116 alone, together, or in any suitable combination. Although FIG. 1 shows one client device 110, in other implementations, the network architecture 100 comprises multiple client devices.

In various implementations, the client device 110 comprises a computing device that includes at least a display and communication capabilities that provide access to the networked system 102 via the network 104. The client device 110 comprises, but is not limited to, a remote device, work station, computer, general purpose computer, Internet appliance, hand-held device, wireless device, portable device, wearable computer, cellular or mobile phone, Personal Digital Assistant (PDA), smart phone, tablet, ultra book, netbook, laptop, desktop, multi-processor system, microprocessor-based or programmable consumer electronic, game consoles, set-top box, network Personal Computer (PC), mini-computer, and so forth. In an example embodiment, the client device 110 comprises one or more of a touch screen, accelerometer, gyroscope, biometrics sensor, camera, microphone, Global Positioning System (GPS) device, and the like.

The client device 110 communicates with the network 104 via a wired or wireless connection. For example, one or more portions of the network 104 comprises an ad hock network, an intranet, an extranet, a Virtual Private Network (VPN), a Local Area Network (LAN), a wireless LAN (WLAN), a Wide Area Network (WAN), a wireless WAN (WWAN), a Metropolitan Area Network (MAN), a portion of the Internet, a portion of the Public Switched Telephone Network (PSTN), a cellular telephone network, a wireless network, a Wireless Fidelity (WI-FI®) network, a Worldwide interoperability for Microwave Access (WiMax) network, another type of network, or any suitable combination thereof.

In some example embodiments, the client device 110 includes one or more of the applications (also referred to as "apps") such as, but not limited to, web browsers, book reader apps (operable to read e-books), media apps (operable to present various media forms including audio and video), fitness apps, biometric monitoring apps, messaging apps, electronic mail (email) apps, and e-commerce site apps (also referred to as "marketplace apps"). In some implementations, the client application(s) 114 include various components operable to present information to the user and communicate with networked system 102. In some embodiments, if the e-commerce site application is included in the client device 110, then this application is configured to locally provide the user interface and at least some of the functionalities with the application configured to communicate with the networked system 102, on an as needed basis, for data or processing capabilities not locally available (e.g., access to a database of items available for sale, to authenticate a user, to verify a method of payment). Conversely, if the e-commerce site application is not included in the client device 110, the client device 110 can use its web browser to access the e-commerce site (or a variant thereof) hosted on the networked system 102.

The web client 112 accesses the various systems of the networked system 102 via the web interface supported by a web server 122. Similarly, the programmatic client 116 and client application(s) 114 accesses the various services and functions provided by the networked system 102 via the programmatic interface provided by an Application Program Interface (API) server 120. The programmatic client 116 can, for example, be a seller application (e.g., the Turbo Lister application developed by EBAY® Inc., of San Jose, California) to enable sellers to author and manage listings on the networked system 102 in an off-line manner, and to perform batch-mode communications between the programmatic client 116 and the networked system 102.

Users (e.g., the user 106) comprise a person, a machine, or other means of interacting with the client device 110. In some example embodiments, the user is not part of the network architecture 100, but interacts with the network architecture 100 via the client device 110 or another means. For instance, the user provides input (e.g., touch screen input or alphanumeric input) to the client device 110 and the input is communicated to the networked system 102 via the network 104. In this instance, the networked system 102, in response to receiving the input from the user, communicates information to the client device 110 via the network 104 to be presented to the user. In this way, the user can interact with the networked system 102 using the client device 110.

The API server 120 and the web server 122 are coupled to, and provide programmatic and web interfaces respectively to, one or more application server(s) 140. The application server(s) 140 may host a listing network platform 142 and a social network initiated listing social network initiated listing system 150, each of which comprises one or more modules or applications and each of which can be embodied as hardware, software, firmware, or any combination thereof. The application server(s) 140 are, in turn, shown to be coupled to one or more database server(s) 124 that facilitate access to one or more information storage repositories or database(s) 126. In an example embodiment, the database(s) 126 are storage devices that store information to be posted (e.g., inventory, image data, catalog data) to the listing network platform 142. The database(s) 126 also stores digital good information accordance with some example embodiments.

Additionally, a social network platform 131 is illustrated executing on third party server(s) 130. Further, the social network platform can programmatically access the networked system 102 via the programmatic interface provided by the API server 120. The social network platform may comprise a social network website, messaging platform, and one or more APIs.

The listing network platform 142 provides a number of publication functions and listing services to the users that access the networked system 102. While the listing network platform 142 is shown in. FIG. 1 to both form part of the networked system 102, it will be appreciated that, in alternative embodiments, the listing network platform 142 may form part of a web service that is separate and distinct from the networked system 102.

In some implementations, the social network initiated listing system 150 provides functionality to obtain posts published on the social network platform and use the posts to generate listings on the listing network platform 142. The social network initiated listing system 150 will be discussed further in connection with FIG. 2 below.

While the client-server-based network architecture 100 shown in FIG. 1 employs a client-server architecture, the present inventive subject matter is, of course, not limited to such an architecture, and can equally well find application in a distributed, or peer-to-peer, architecture system, for example. The various systems of the applications server(s) 140 (e.g., the listing network platform 142 and the social network initiated listing system 150) may also be implemented as standalone software programs, which do not necessarily have networking capabilities.

The listing network platform 142 can be hosted on dedicated or shared server machines that are communicatively coupled to enable communications between server machines. The components themselves are communicatively coupled (e.g., via appropriate interfaces) to each other and to various data sources, so as to allow information to be passed between the applications or so as to allow the applications to share and access common data. Furthermore, the components access one or more database(s) 126 via the database server(s) 124. The listing network platform 142 provides a number of publishing, listing, and listing mechanisms whereby a seller (also referred to as a "first user") may list (or publish information concerning) goods or services for sale or barter, a buyer (also referred to as a "second user") can express interest in or indicate a desire to purchase or barter such goods or services, and a transaction (such as a trade) may be completed pertaining to the goods or services.

Figure 2:
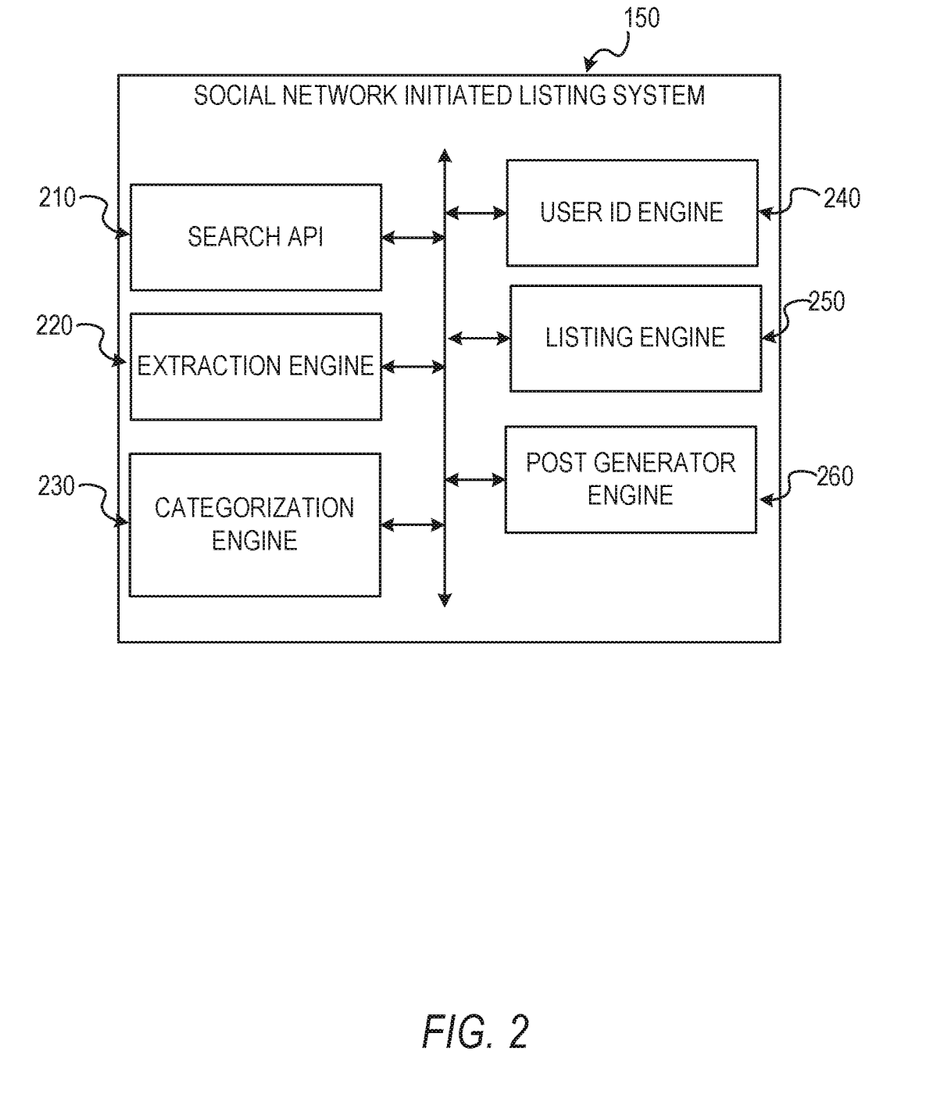
FIG. 2 is a block diagram showing example components provided within the social network initiated listing system of FIG. 1, according to some example embodiments.

FIG. 2 illustrates functional components of the social network initiated listing system 150, according to some example embodiments. As illustrated, the social network initiated listing system 150 comprises a search application programming interface (API) 210, an extraction engine 220, a categorization engine 230, a user identification engine 240, a listing engine 250, and a post generator engine 260. The search API 210 is configured to submit searches to the social network platform 131. In particular, for example, the search API 210 submits a query requesting all social network posts that include a sell code. The sell code is the code included in a social network post to indicate that the user that published the post desires to sell an item described in the post. The extraction engine 220 is configured to identify a post containing the sell code and extract keywords from the post to identify the item, the price, and other information to create a listing. The categorization engine 230 is configured to receive the extracted keywords as a string and output a suggested categorization for the item being listed. The user ID engine 240 is configured to identify a listing account of the user that posted the social network post. In some embodiments, the user identifies the account by checking which users have active sessions on the social network platform 131 and on the listing platform. The listing engine 250 uses the keywords and other data (e.g., user uploaded photos), as well as the generated categorization to create a listing on the listing platform. The listing is a listing web page published using a uniform resource locator (URL) from the listing platform. In some example embodiments, the listing web page includes an offer for sale (e.g., text describing an offer for sale), an image of the item for sale, and additional item information (e.g., model, type, attributes). The post generator engine 260 is configured to generate a post to be published on the social network platform. The publish post includes link reference to the newly created listing.

Figure 3:
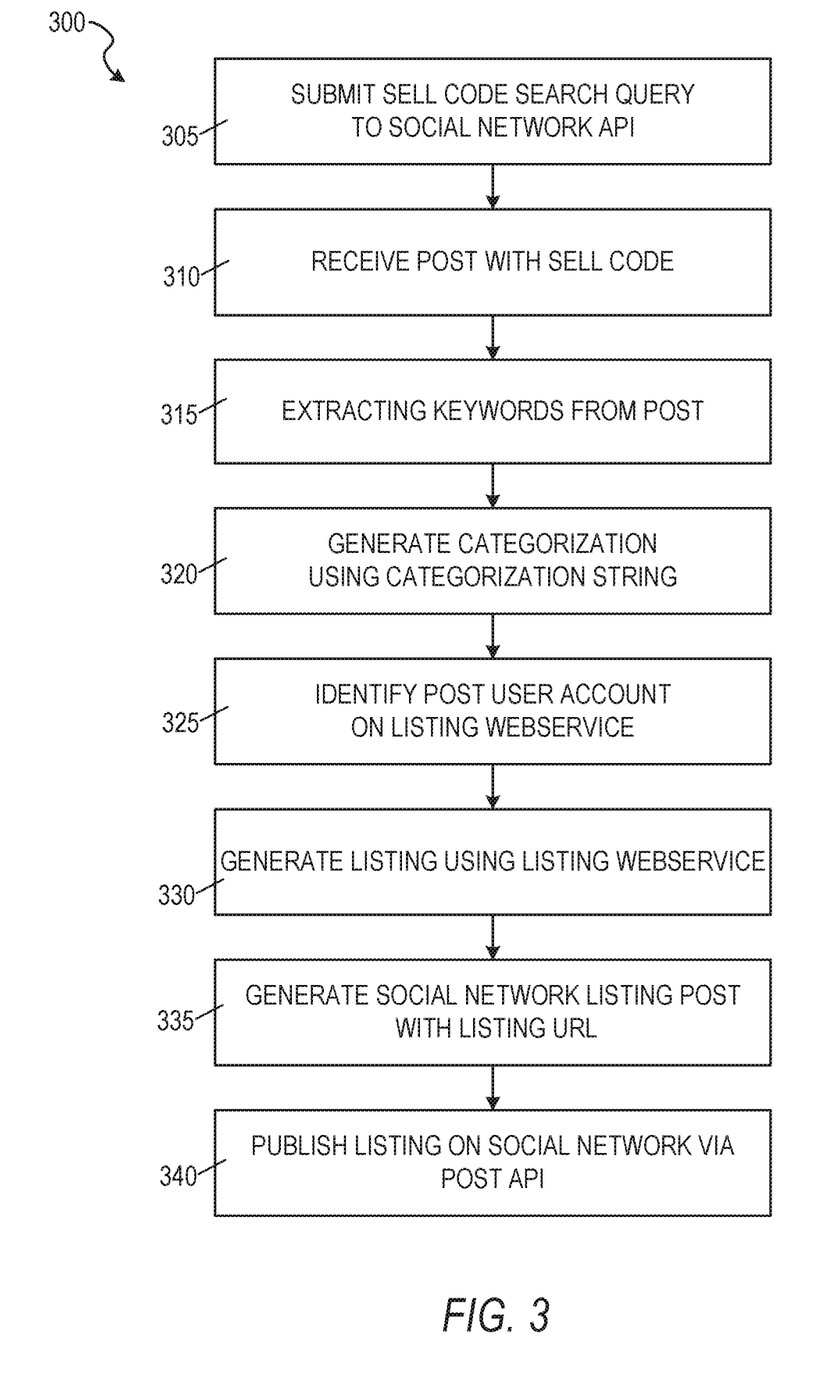
FIG. 3 is a flow diagram of a method for performing social network initiated listings, according to some example embodiments.

FIG. 3 illustrates a flow diagram for a method 300 for social network initiated listings according to some example embodiments. At operation 305, the search API 210 submits a query to the social network platform 131 requesting social network posts from different users that contain the sell code. In some example embodiments, the sell code is a hash tag, such as "#sell_ebay". In some example embodiments, the sell code is one or more terms in a direct message (e.g., private chat) between users of the social network platform. At operation 310, the search API 210 receives the query results including at least one post that contains the sell code. For example, the post may be a social network post submitted by the user 106. At operation 315, the extraction engine 220 extracts keywords from the post. At operation 320, the categorization engine 230 categorizes the item mentioned in the post using the extracted keywords. The item is categorized using a categorization database of the listing website. In this way, when the listing is created it is already correctly categorized according to the categorization hierarchy of the listing website.

At operation 325, the user ID engine 240 identifies a listing user account of the user 106. In some example embodiments, the user 106 is logged into both the social network platform 131 and the listing network platform 142 (e.g., a user has two network sessions active from client device 110). In those example embodiments, the user ID engine 240 determines that the active session of the social network platform belongs to the social network user account that created the post. For example, the user ID information checks cookie information stored on client device 110. Further, the user ID engine 240 checks whether the user has an active session on the listing network platform 142. The user ID engine 240 can determine whether there is an active session on the listing platform because the social network initiated listing system is within the same network 102 (e.g., hosted by application server 140 and thus can share data). Because the user is logged into the listing network platform 142 an active session exists and the user ID 240 assigns the listing account as the user account that has a current active session on the listing network platform 142.

In some example embodiments, the social media website usernames of users (e.g., the user that created the post received in operation 310) are linked to listing website usernames of the listing website. In those embodiments, the linkings are stored in a table in database 126 for later lookup requests from the user ID engine 240. For example, the user can log into the listing website, and input his/her username on the social media account. The user ID engine 240 then links the user's listing website username and social media website username in the database 126. In this way, when a post is received at operation 310, the user ID engine 240 identifies from which social media website username the post was published on the social media website, then checks whether the username has a corresponding account on the listing website for listing creation.

At operation 330, the listing engine 250 generates a listing for the item described in the post. In some example embodiments, the listing engine 250 uses the categorization generated by the categorization engine 230 to retrieve catalog data for the categorized item. For example, if the item is categorized as a certain model of smart phone, the catalog data may be pre-generated data that describes that model, as described in further detail in FIG. 4C. In some example embodiments, the extracted keywords are used in place of the catalog data. Further, in some example embodiments, both the catalog data and the extracted keywords are included in the listing.

At operation 335, the post generator engine 260 generates a post to be published on the social network platform 131 through a post submit API of the social network platform 131. In an example, the post generated at operation 335 is a listing post that announces the start of the listing and contains a uniform resource locator (URL) that directs users to the listing hosted on the website. At operation 340, the post generator engine 260 programmatically publishes the listing post on the social network platform 131 using the social network user account of user 106.

Once the listing post is published on the social network platform 131, other users of the social network platform can click on the URL of the listing post, to be directed to the listing on the listing network platform 142. Once on the listing platform, the other users can log in and complete the listing through the listing network platform 142.

Figure 4A:
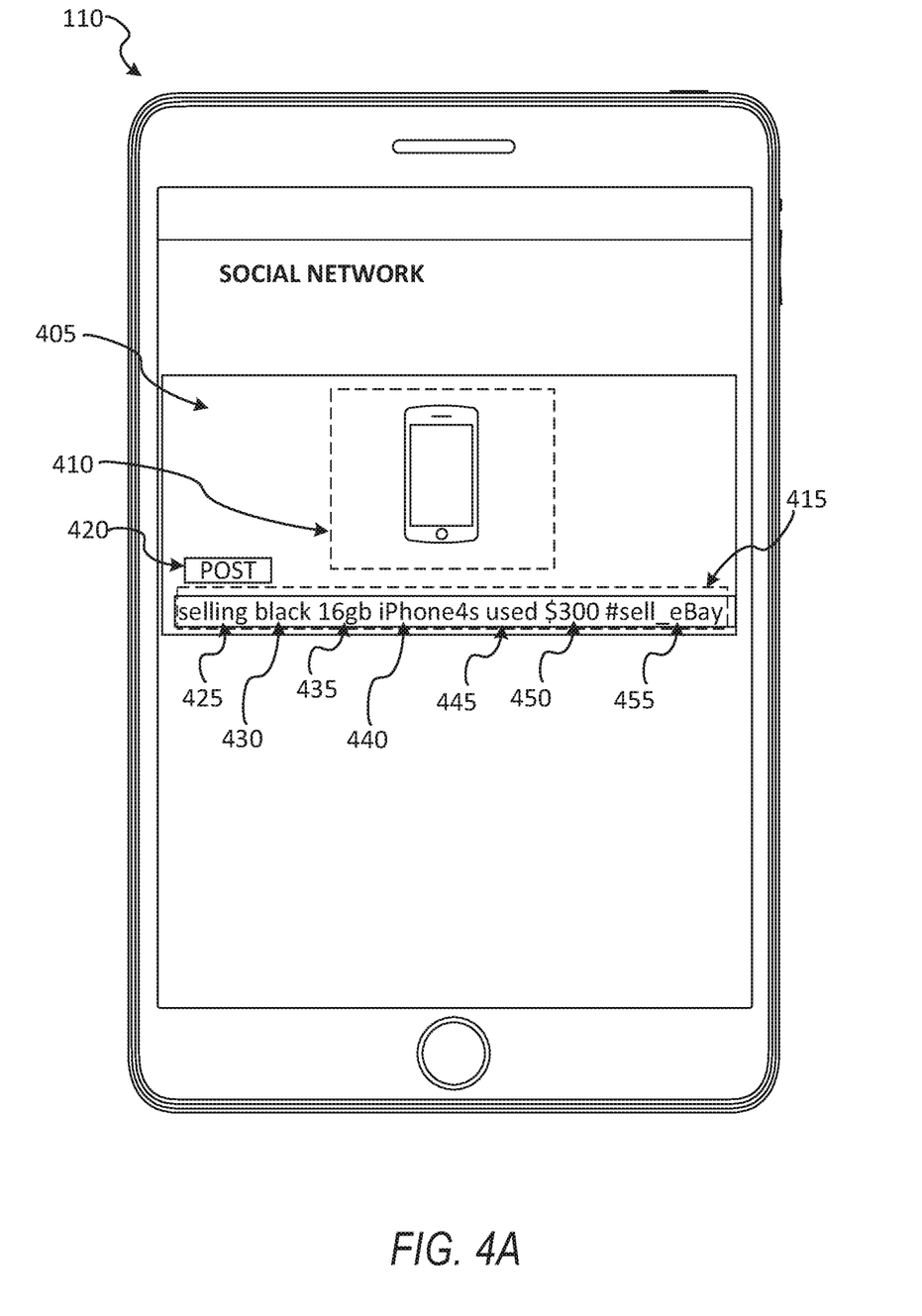
FIG. 4A-C illustrate aspects of user interfaces provided by the social network initiated listings, according to some example embodiments.
Figure 4B:
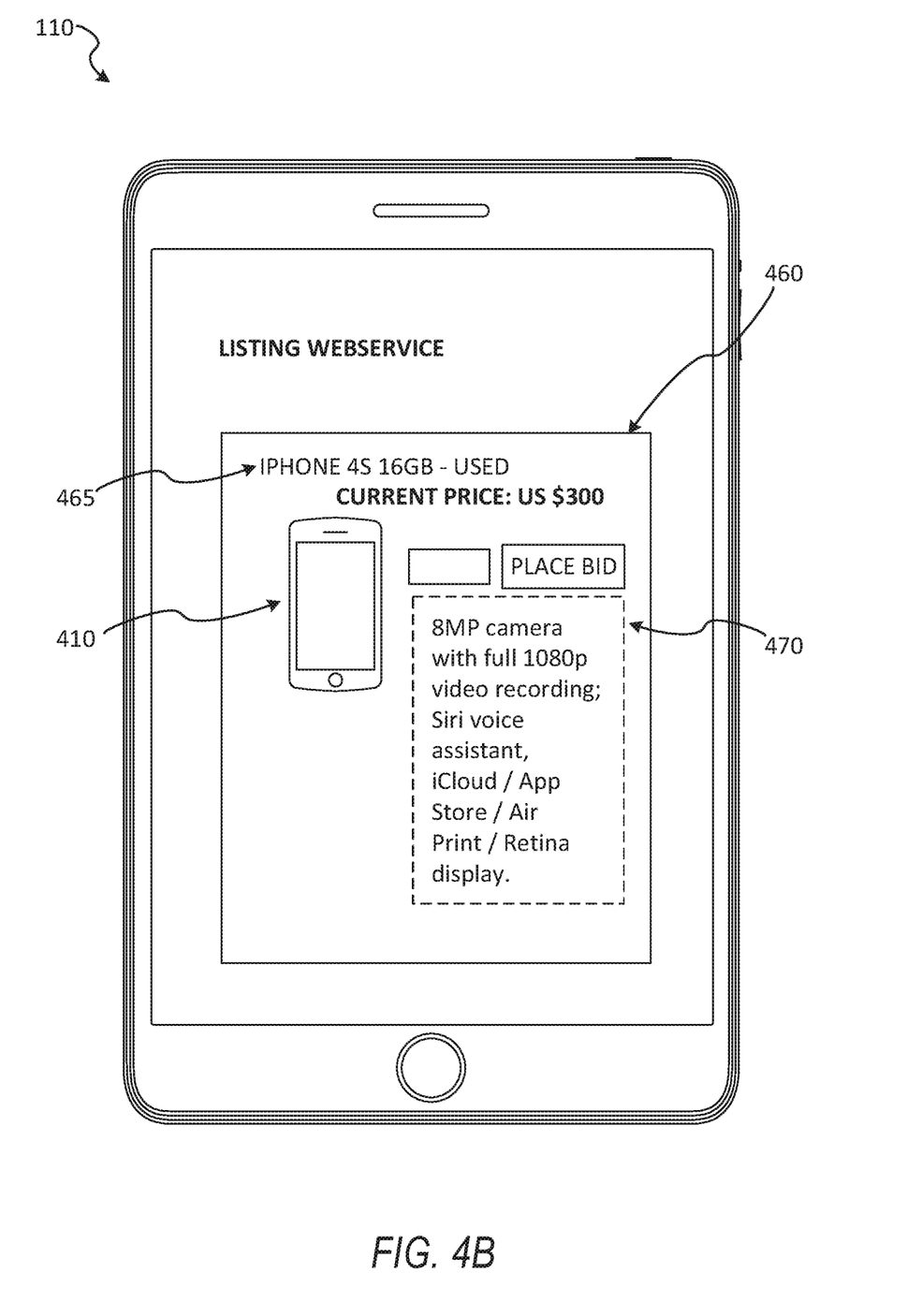
Figure 4C:
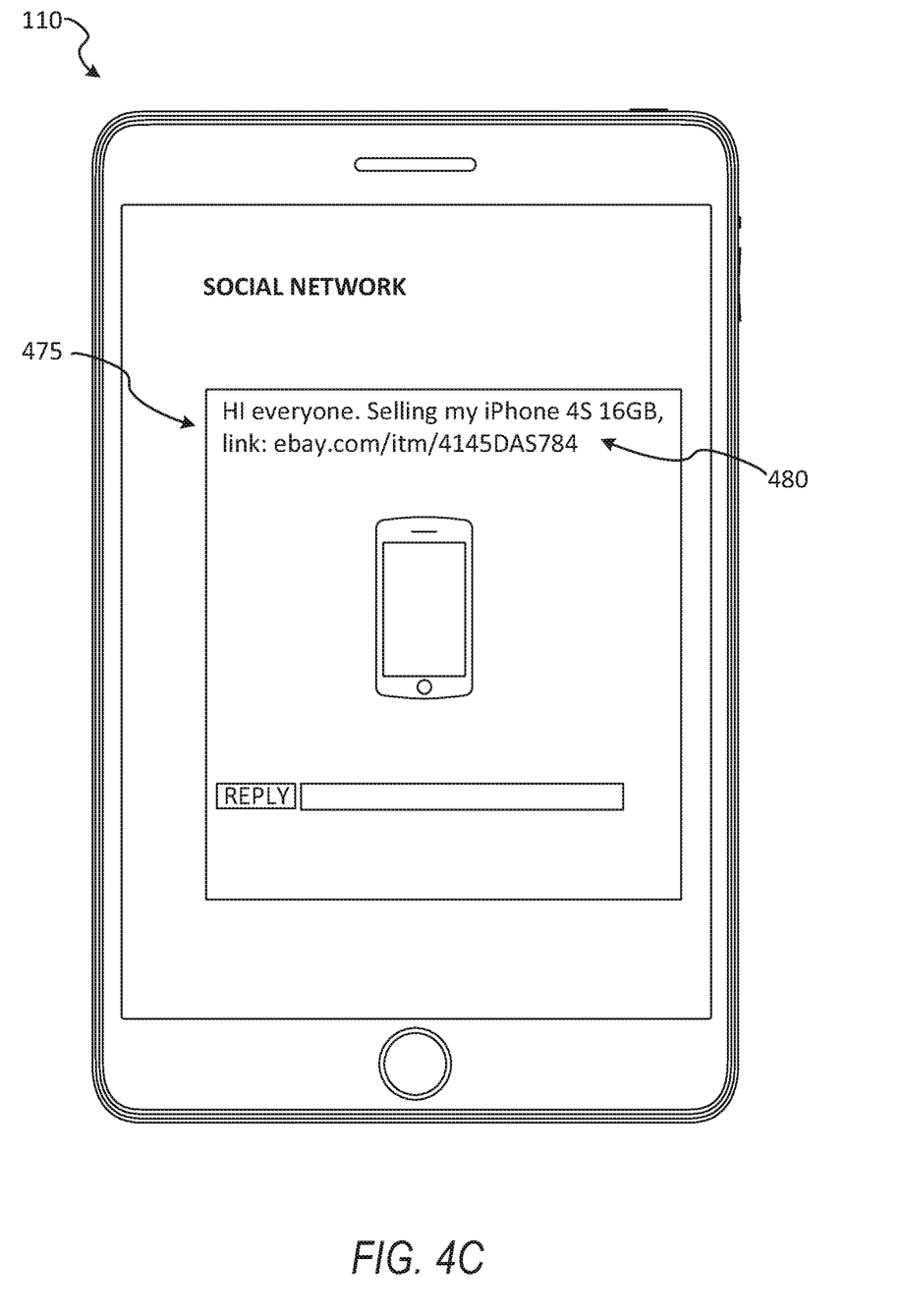

FIGS. 4A-4C illustrate a client device 400 implementing the social network initiated listings, according to some example embodiments. In FIG. 4A, the client device 400 is illustrated as a tablet which is using a client application 114 or web client 112 to browse on the social network platform 131. The user 106 is in the process of generating a post using a post user interface 405 to sell his/her iPhone™. The user 106 can upload his/her own image of the iPhone as a user submitted image 410 to be included in the post, according to some embodiments. Further, in some example embodiments, the user 106 does not include an image and the listing engine 250 can use catalog data in place of the user uploaded image (e.g., catalog image of an iPhone instead of the user uploaded image).

The post user interface 405 further illustrates a user button 420 configured to publish the post upon being selected. Further illustrated is the post message 415 comprising a plurality of keywords 425-455. In some embodiments, some of the keywords such as an item descriptor keyword 440 ("iPhone 4s"), price keyword 450 ("$300"), and the sell code 455 are the minimum required keywords to initiate the listing processes disclosed herein. Other keywords that be included in the post message include non-active post text 425 ("selling") which is data that can be useful to describe the event to other users on the social network platform. The non-active post text 425 is any data that is not used to create the post listing on the listing platform (e.g., "Hi everyone, I'm selling my iPhone, here are the details:"). Further, a color keyword 430 ("black"), item attribute keyword 435 (e.g., such as a memory size of "16 GB") and a condition keyword 445 ("used") can also be included in the post message to be later used to create the listing. Once the post published, it can be located by the search query operation described above, in which the search API 210 requests all social network posts that include the sell code 455.

FIG. 4B illustrates the client device 110 viewing the listing 460 generated from the social network post, according to some example embodiments. The listing 460 includes a title 465, which can be generated using the categorization data. For example, any item that is categorized as a used iPhone 4S can use the same title, such as title 465. Further, the user submitted image 410 is used in place of the catalog photo. The listing 460 further includes catalog data, such as description data for the category into which the item was classified.

FIG. 4C illustrates the client device 110 presenting a listing post 475 on the social network platform 131, according to some example embodiments. As illustrated, the listing post includes the URL 480 to the listing. Upon selecting the URL 480, the user is directed to the listing to complete the listing (e.g., bid and purchase the listed item).

Certain embodiments are described herein as including logic or a number of components, modules, or mechanisms. Modules can constitute either software modules (e.g., code embodied on a machine-readable medium) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) can be configured by software (e.g., an application or application portion) as a hardware module that operates to perform certain operations as described herein.

In some embodiments, a hardware module can be implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module can include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules can be located in a single geographic location (e.g., within a home environment, an office environment, or a server farm). In other example embodiments, the processors or processor-implemented modules are distributed across a number of geographic locations.

The modules, methods, applications and so forth described in conjunction with FIGS. 1-4 are implemented in some embodiments in the context of a machine and an associated software architecture. The sections below describe representative software architecture and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, and the like. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the inventive subject matter in different contexts from the disclosure contained herein.

Figure 5:
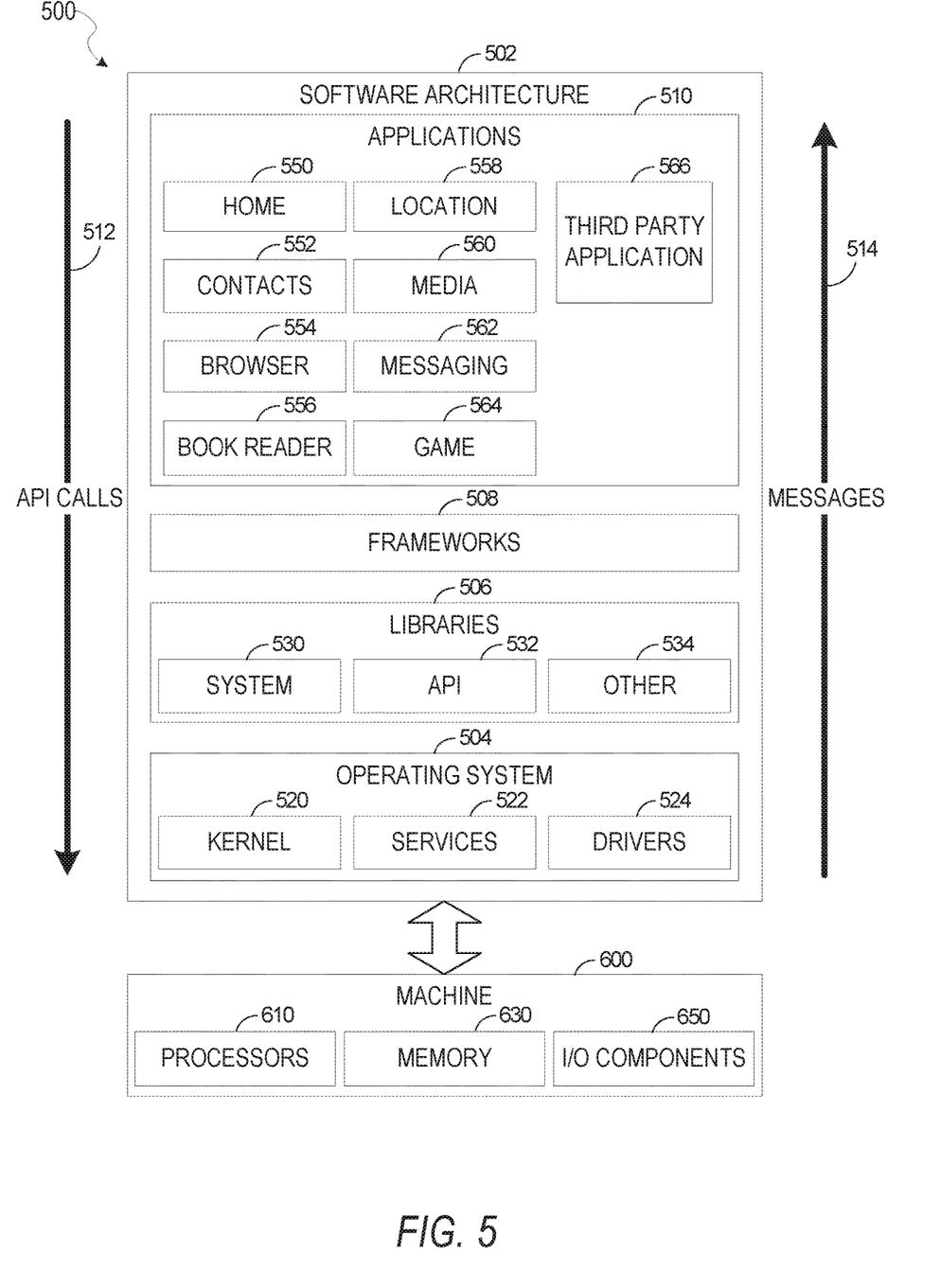
FIG. 5 is a block diagram illustrating architecture of software used to implement social network initiated listings, according to some example embodiments.

FIG. 5 is a block diagram 500 illustrating an architecture of software 502, which can be installed on any one or more of the devices described above. FIG. 5 is merely a non-limiting example of a software architecture, and it will be appreciated that many other architectures can be implemented to facilitate the functionality described herein. In various embodiments, the software 502 is implemented by hardware such as a machine 600 of FIG. 6 that includes processors 610, memory 630, and I/O components 650. In this example architecture, the software 502 can be conceptualized as a stack of layers where each layer may provide a particular functionality. For example, the software 502 includes layers such as an operating system 504, libraries 506, frameworks 508, and applications 510. Operationally, the applications 510 invoke application programming interface (API) calls 512 through the software stack and receive messages 514 in response to the API calls 512, consistent with some embodiments.

In various implementations, the operating system 504 manages hardware resources and provides common services. The operating system 504 includes, for example, a kernel 520, services 522, and drivers 524. The kernel 520 acts as an abstraction layer between the hardware and the other software layers, consistent with some embodiments. For example, the kernel 520 provides memory management, processor management (e.g., scheduling), component management, networking, and security settings, among other functionality. The services 522 can provide other common services for the other software layers. The drivers 524 are responsible for controlling or interfacing with the underlying hardware, according to some embodiments. For instance, the drivers 524 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 506 provide a low-level common infrastructure utilized by the applications 510. The libraries 506 can include system libraries 530 (e.g., C standard library) that can provide functions such as memory allocation functions, string manipulation functions, mathematic functions, and the like. In addition, the libraries 506 can include API libraries 532 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 506 can also include a wide variety of other libraries 534 to provide many other APIs to the applications 510.

The frameworks 508 provide a high-level common infrastructure that can be utilized by the applications 510, according to some embodiments. For example, the frameworks 508 provide various graphic user interface (GUI) functions, high-level resource management, high-level location services, and so forth. The frameworks 508 can provide a broad spectrum of other APIs that can be utilized by the applications 510, some of which may be specific to a particular operating system or platform.

In an example embodiment, the applications 510 include a home application 550, a contacts application 552, a browser application 554, a book reader application 556, a location application 558, a media application 560, a messaging application 562, a game application 564, and a broad assortment of other applications such as a third-party application 566. According to some embodiments, the applications 510 are programs that execute functions defined in the programs. Various programming languages can be employed to create one or more of the applications 510, structured in a variety of manners, such as object-oriented programming languages (e.g., Objective-C, Java, or C++) or procedural programming languages (e.g., C or assembly language). In a specific example, the third-party application 566 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 566 can invoke the API calls 512 provided by the operating system 504 to facilitate functionality described herein.

Figure 6:
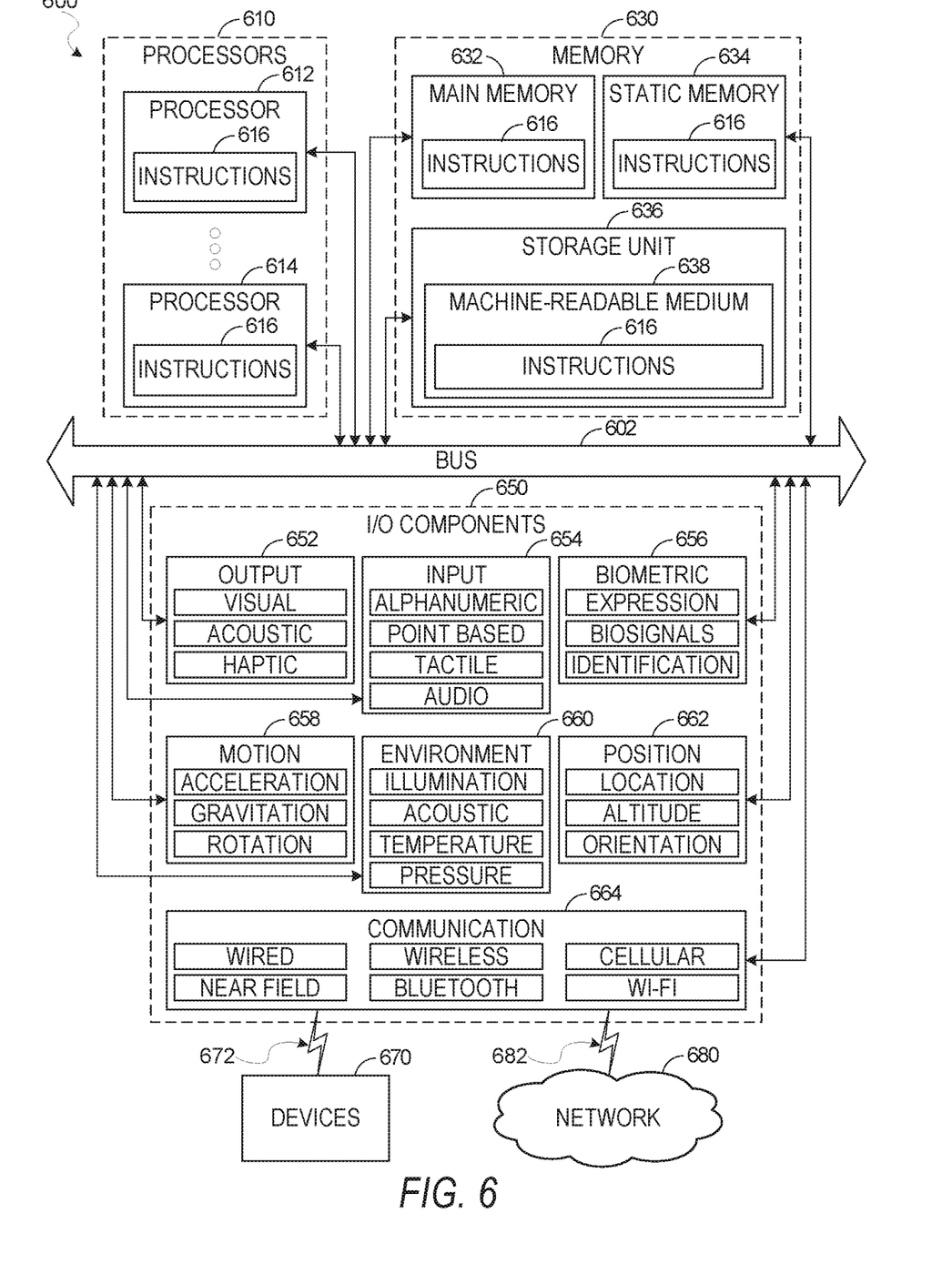
FIG. 6 shows a machine as an example computer system with instructions to cause the machine to implement social network initiated listings, according to some example embodiments.

FIG. 6 illustrates a diagrammatic representation of a machine 600 in the form of a computer system within which a set of instructions may be executed for causing the machine to perform any one or more of the methodologies discussed herein, according to an example embodiment. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. For example, the instructions 616 may cause the machine 600 to execute the method XYZ of FIG. 6. The instructions 616 transform the general, non-programmed machine 600 into a particular machine 600 programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory 630, and I/O components 650, which may be configured to communicate with each other such as via a bus 602. In an example embodiment, the processors 610 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 612 and a processor 614 that may execute the instructions 616. The term "processor" is intended to include multi-core processors that may comprise two or more independent processors (sometimes referred to as "cores") that may execute instructions contemporaneously. Although FIG. 6 shows multiple processors 610, the machine 600 may include a single processor with a single core, a single processor with multiple cores (e.g., a multi-core processor), multiple processors with a single core, multiple processors with multiples cores, or any combination thereof.

The memory 630 may include a main memory 632, a static memory 634, and a storage unit 636, both accessible to the processors 610 such as via the bus 602. The main memory 630, the static memory 634, and storage unit 636 store the instructions 616 embodying any one or more of the methodologies or functions described herein. The instructions 616 may also reside, completely or partially, within the main memory 632, within the static memory 634, within the storage unit 636, within at least one of the processors 610 (e.g., within the processor's cache memory), or any suitable combination thereof, during execution thereof by the machine 600.

The I/O components 650 may include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion and the grouping is in no way limiting. In various example embodiments, the I/O components 650 may include output components 652 and input components 654. The output components 652 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 650 may include biometric components 656, motion components 658, environmental components 660, or position components 662, among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 662 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 650 may include communication components 664 operable to couple the machine 600 to a network 680 or devices 670 via a coupling 682 and a coupling 672, respectively. For example, the communication components 664 may include a network interface component or another suitable device to interface with the network 680. In further examples, the communication components 664 may include wired communication components, wireless communication components, cellular communication components, Near Field Communication (NFC) components, Bluetooth® components (e.g., Bluetooth Low Energy), Wi-Fi® components, and other communication components to provide communication via other modalities. The devices 670 may be another machine or any of a wide variety of peripheral devices (e.g., a peripheral device coupled via a USB).

Moreover, the communication components 664 may detect identifiers or include components operable to detect identifiers. For example, the communication components 664 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 664, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 630, 632, 634, and/or memory of the processor(s) 610) and/or storage unit 636 may store one or more sets of instructions and data structures (e.g., software) embodying or utilized by any one or more of the methodologies or functions described herein. These instructions (e.g., the instructions 616), when executed by processor(s) 610, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 680 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or another type of cellular or wireless coupling. In this example, the coupling 682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 616 may be transmitted or received over the network 680 using a transmission medium via a network interface device (e.g., a network interface component included in the communication components 664) and utilizing any one of a number of well-known transfer protocols (e.g., hypertext transfer protocol (HTTP)). Similarly, the instructions 616 may be transmitted or received using a transmission medium via the coupling 672 (e.g., a peer-to-peer coupling) to the devices 670. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 616 for execution by the machine 600, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

Computer-Readable Medium

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

The invention claimed is:

1. A method, comprising:
receiving user identification information from a client device through an application programming interface (API), the user identification information including a social network site username and a listing network site username;
linking the user identification information to a database;
receiving a social network post on a social network site submitted by the client device through the API, the social network post referencing an item;
accessing the database to identify a listing network site associated with the listing network site username based on receiving the social network post;
checking cookie information stored on the client device;

determining that the client device has a first active session on the social network site and a second active session on the listing network site based on the cookie information;

identifying a listing user account based on the second active session;

generating, based on the identified listing user account, a listing for the item on the listing network site; and publishing the listing on the social network site with a post submit API based on the client device having the first active session at the social network site and the client device having the second active session at the listing network site.

2. The method of claim 1, wherein the social network post includes an image, and the method further comprises adding the image to the listing.

3. The method of claim 1, further comprising:
determining a category based on the social network post; and
setting a category of the item in the listing to the determined category.

4. The method of claim 3, wherein the determining of the category is based on an output received from a machine learning model.

5. The method of claim 3, further comprising retrieving catalog data based on the category, and populating the listing based on the catalog data.

6. The method of claim 1, wherein the social network post includes a hashtag, and the generating of the listing is in response to identifying the hashtag in the social network post.

7. The method of claim 1, further comprising receiving search results including the social network post in response to a query requesting posts that include a sell code, wherein the receiving the social network post is in response to the search results.

8. A system, comprising:
hardware processing circuitry;
one or more hardware memories storing instructions that when executed configure the hardware processing circuitry to perform operations comprising:
receiving user identification information from a client device through an application programming interface (API), the user identification information including a social network site username and a listing network site username;
linking the user identification information to a database;
receiving a social network post on a social network site submitted by the client device through the API, the social network post referencing an item;
accessing the database to identify a listing network site associated with the listing network site username based on receiving the social network post;
checking cookie information stored on the client device;
determining that the client device has a first active session on the social network site and a second active session on the listing network site based on the cookie information;
identifying a listing user account based on the second active session;
generating, based on the identified listing user account, a listing for the item on the listing network site; and
publishing the listing on the social network site with a post submit API based on the client device having the first active session at the social network site and the client device having the second active session at the listing network site.

9. The system of claim 8, wherein the social network post includes an image, and the operations further comprise adding the image to the listing.

10. The system of claim 8, the operations further comprising:
determining a category based on the social network post; and
setting a category of the item in the listing to the determined category.

11. The system of claim 10, wherein the determining of the category is based on an output received from a machine learning mode.

12. The system of claim 11, the operations further comprising retrieving catalog data based on the category, and populating the listing based on the catalog data.

13. The system of claim 8, wherein the social network post includes a hashtag, and the generating of the listing is in response to identifying the hashtag in the social network post.

14. The system of claim 8, the operations further comprising receiving search results including the social network post in response to a query requesting posts that include a sell code, wherein the receiving of the social network post is in response to the search results.

15. A non-transitory computer readable storage medium comprising instructions that when executed configure hardware processing circuitry to perform operations comprising:
receiving user identification information from a client device through an application programming interface (API), the user identification information including a social network site username and a listing network site username;
linking the user identification information to a database;
receiving a social network post on a social network site submitted by the client device through the API, the social network post referencing an item;
accessing the database to identify a listing network site associated with the listing network site username based on receiving the social network post;
checking cookie information stored on the client device;
determining that the client device has a first active session on the social network site and a second active session on the listing network site based on the cookie information;
identifying a listing user account based on the second active session;
generating, based on the identified listing user account, a listing for the item on the listing network site; and
publishing the listing on the social network site with a post submit API based on the client device having the first active session at the social network site and the client device having the second active session at the listing network site.

16. The non-transitory computer readable storage medium of claim 15, the operations further comprising:
determining, using an output from a machine learning model, a category based on the social network post; and
setting a category of the item in the listing to the determined category.

17. The non-transitory computer readable storage medium of claim 15, wherein the social network post includes a hashtag, and the generating of the listing is in response to identifying the hashtag in the social network post.

\* \* \* \* \*